US006393339B1

(12) United States Patent
Yeadon

(10) Patent No.: US 6,393,339 B1
(45) Date of Patent: May 21, 2002

(54) COMPUTERIZED STOCK CONTROL SYSTEM

(75) Inventor: William Sydney Yeadon, Lower Templestowe (AU)

(73) Assignee: Biovend Limited, South Melbourne (AU)

( * ) Notice: Subject to any disclaimer, the term of this patent is extended or adjusted under 35 U.S.C. 154(b) by 0 days.

(21) Appl. No.: 09/445,119

(22) PCT Filed: Jun. 3, 1998

(86) PCT No.: PCT/AU98/00416

§ 371 Date: Dec. 2, 1999

§ 102(e) Date: Dec. 2, 1999

(87) PCT Pub. No.: WO98/55968

PCT Pub. Date: Dec. 10, 1998

(30) Foreign Application Priority Data

Jun. 3, 1997 (AU) ............................................ PO 7149

(51) Int. Cl.[7] ................................................ G06F 17/00

(52) U.S. Cl. ....................... 700/237; 700/232; 700/236; 700/244

(58) Field of Search ................................ 700/231, 232, 700/236, 237, 241, 242, 243, 244; 221/2, 150 R

(56) References Cited

U.S. PATENT DOCUMENTS 4,639,875 A * 1/1987 Abraham et al. ........... 364/479
4,847,764 A * 7/1989 Halvorson ............. 364/413.02
5,014,875 A * 5/1991 McLaughlin et al. .......... 221/2
5,701,252 A 12/1997 Facchin et al. ............. 364/479
RE35,743 E * 3/1998 Pearson ......................... 221/2
5,745,366 A * 4/1998 Higham et al. ........ 364/479.12
5,797,515 A * 8/1998 Liff et al. ...................... 221/2
5,805,455 A * 9/1998 Lipps .................... 364/479.01
5,852,911 A * 12/1998 Yuyama et al. ........ 364/479.12
5,902,984 A * 5/1999 Planke ....................... 235/381
5,930,145 A * 7/1999 Yuyama et al. ........ 364/479.01
5,993,046 A * 11/1999 McGrady et al. ...... 364/479.01
6,003,006 A * 12/1999 Colella et al. ................. 705/2
6,152,364 A * 11/2000 Schoonen et al. .......... 235/375

FOREIGN PATENT DOCUMENTS

WO 9525423 9/1995 ........... G06F/19/00
WO 9612254 4/1996 ............. G07F/7/08
WO 9729729 8/1997 ............. A61J/7/00

* cited by examiner

*Primary Examiner*—Christopher P. Ellis
*Assistant Examiner*—Khoi H. Tran
(74) *Attorney, Agent, or Firm*—James Ray & Associates

(57) ABSTRACT

A computerized stock control system having a refrigerated carousel dispensing station. The dispensing station includes a user identification device, an article identification output device to provide identification of articles to be dispensed, and an article identification input device to provide identification of restocking articles prior to the dispensing process. The user must enter user identification data through the user identification device and be acknowledged by the dispensing station as an authorized user prior to the dispensing process. The user must also enter identification data of the article to be dispensed through the article identification output device which then clears the system for dispensing the requested article. The dispensing station logs the user identification data and the identification data of article(s) to be dispensed and conveys the data to a central computer. The central computer also provides reports via the output device concerning article dispensing.

6 Claims, 5 Drawing Sheets

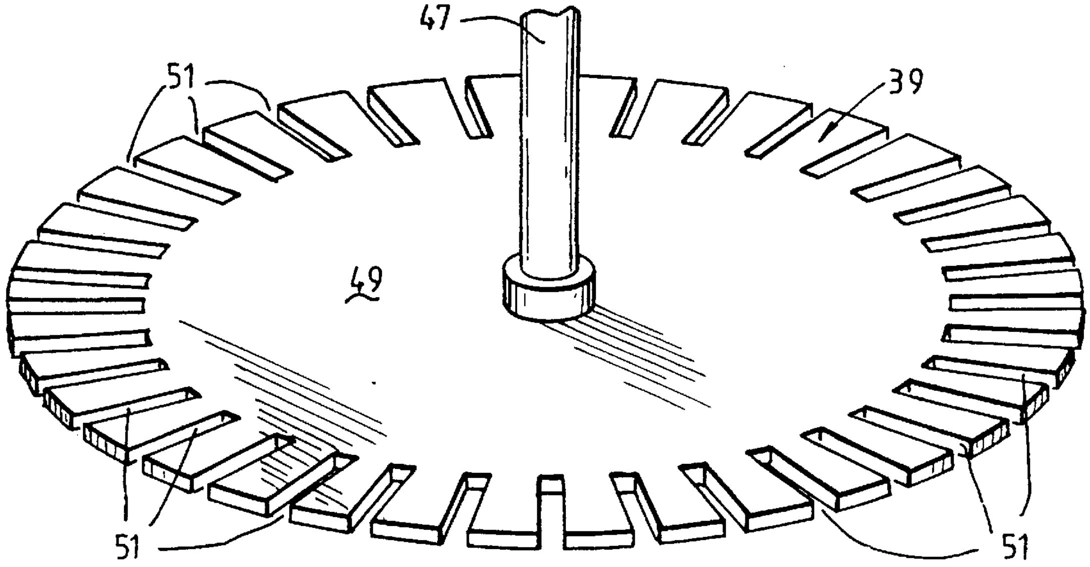
FIG. 4.
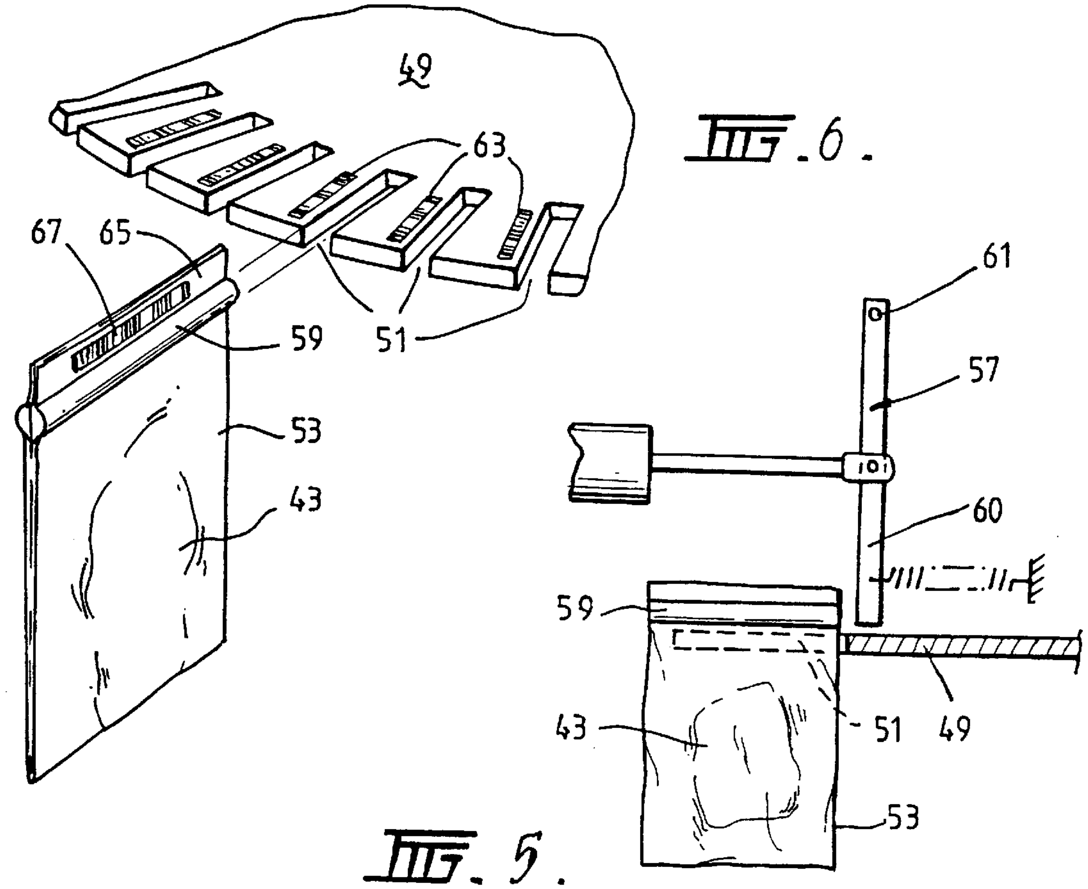
FIG. 6.
FIG. 5.

COMPUTERIZED STOCK CONTROL SYSTEM

FIELD OF THE INVENTION

This invention relates to a computerised stock control system and relates particularly but not exclusively to such for use in connection with dispensing of chemicals and/or drugs in research establishments, hospitals or the like.

DESCRIPTION OF PRIOR ART

Hitherto, stock which is to be dispensed such as chemicals and drugs at research establishments, hospitals or the like have been controlled manually either by an honor system by an individual requesting the stock or by a person who picks stock from a store. The prior systems have possessed a number of disadvantages. One of these disadvantages is that often, stock is dispensed without there being a genuine need for the stock to be used. In some environments, accurate records are not kept of stock usage and this has led generally to inefficiencies in stock control. Another disadvantage is that a particular individual or a department in which that individual works may have a particular budget. It has been very difficult in the past to accurately control and monitor the stock within the allocated budget. Another disadvantage is that, because of inefficiencies of records keeping, stock is not always replaced in a main store where the stock is picked until such time that the stock is exhausted or dangerously low in supply for the needs of the individual or department. Another disadvantage is that certain stock should be available only to selected persons and the required procedures to check this have been cumbersome.

OBJECT AND STATEMENTS OF THE INVENTION

The present invention has been devised to attempt to alleviate one or more of the aforementioned problems.

Therefore according to a first broad aspect of the present invention there is provided a computerised stock control system comprising:

a) a central computer device for controlling a central part of the system b) at least one dispensing station where stock can be dispensed, c) an output means from which reports can be generated concerning stock, d) a software programme controlling said computer device for controlling the central part of the system;

said at least one dispensing station including user identification means, and stock identification input means to provide identification of stock to be dispensed from said dispensing station and also to provide identification of stock which is passed into said dispensing station for subsequent dispensing, dispensing station computing means connected with said user identification means and said input means, and a software program for controlling said dispensing station computing means, said dispensing station computing means being coupled with said central computer device to pass stock and user data therebetween;

said system operating such that when stock is passed into said dispensing station, said stock identification input means is used to obtain data relating to the stock being passed,.and when stock is required to be dispensed a user must enter user identification data through said user identification means and be acknowledged by the dispensing station computing means as an authorised person to dispense stock to and said user must also enter identification data of stock to be dispensed through said stock identification means which then clears the system for dispensing the requested stock, said dispensing station computing means logging the user identification data and the identification data of stock to be dispensed and conveying that data to said central computer device, said central computer device processing that data and providing a report via said output means concerning stock dispensing.

Most preferably said user identification means must be activated by a person adding stock to said dispensing station so that data identifying that person can be acknowledged by the dispensing station computer means as an authorised stock adding person in order that the system will accept data from said input means which identifies stock being passed into said dispensing station.

Most preferably in one embodiment said dispensing station is an automated dispensing cabinet and wherein particular stock to be dispensed is selected amongst a variety of stock contained therein, said cabinet having selecting means responsive to an output from said dispensing station computing means said output being generated when the system is cleared for dispensing the requested stock and acting through dispensing means by automatically dispensing the requested stock.

Most preferably, in another embodiment, said dispensing station is a manual dispensing station where an authorised attendant manually picks stock to be dispensed in response to the system being cleared to dispense stock.

Most preferably the user identification data is used to check against authorisation records to determine particular stock that is allowed to be dispensed to that user and to determine stock that is not allowed to be dispensed to that user.

Most preferably said dispensing station user identification means comprises a reader means for reading user identification code on a user carried card.

Most preferably said user carried card contains not only a record of the user identification but data of budget amounts for that user, and said software at said dispensing station is able to interrogate said card to extract that data of budget amounts and calculate if requested stock is within the budget amount and to update the card with the remaining balance against budget after dispensing the requested stock.

BRIEF DESCRIPTION OF DRAWINGS

In order that the invention can be more clearly ascertained an example of a preferred embodiment for use in connection with dispensing bio-chemical materials will now be described with reference to the accompanying drawings wherein:

FIG. 4 is a top perspective view of part of a carousel fitted within the refrigerated cabinet of FIG. 3, FIG. 5 is a part diagrammatical view showing detail of how stock can be dispensed from the carousel.

FIG. 6 is a perspective view showing part of the dispensing carousel and a bag like container in which bio-chemicals are retained.

DETAILED DESCRIPTION OF PREFERRED EMBODIMENTS

Figure 1:
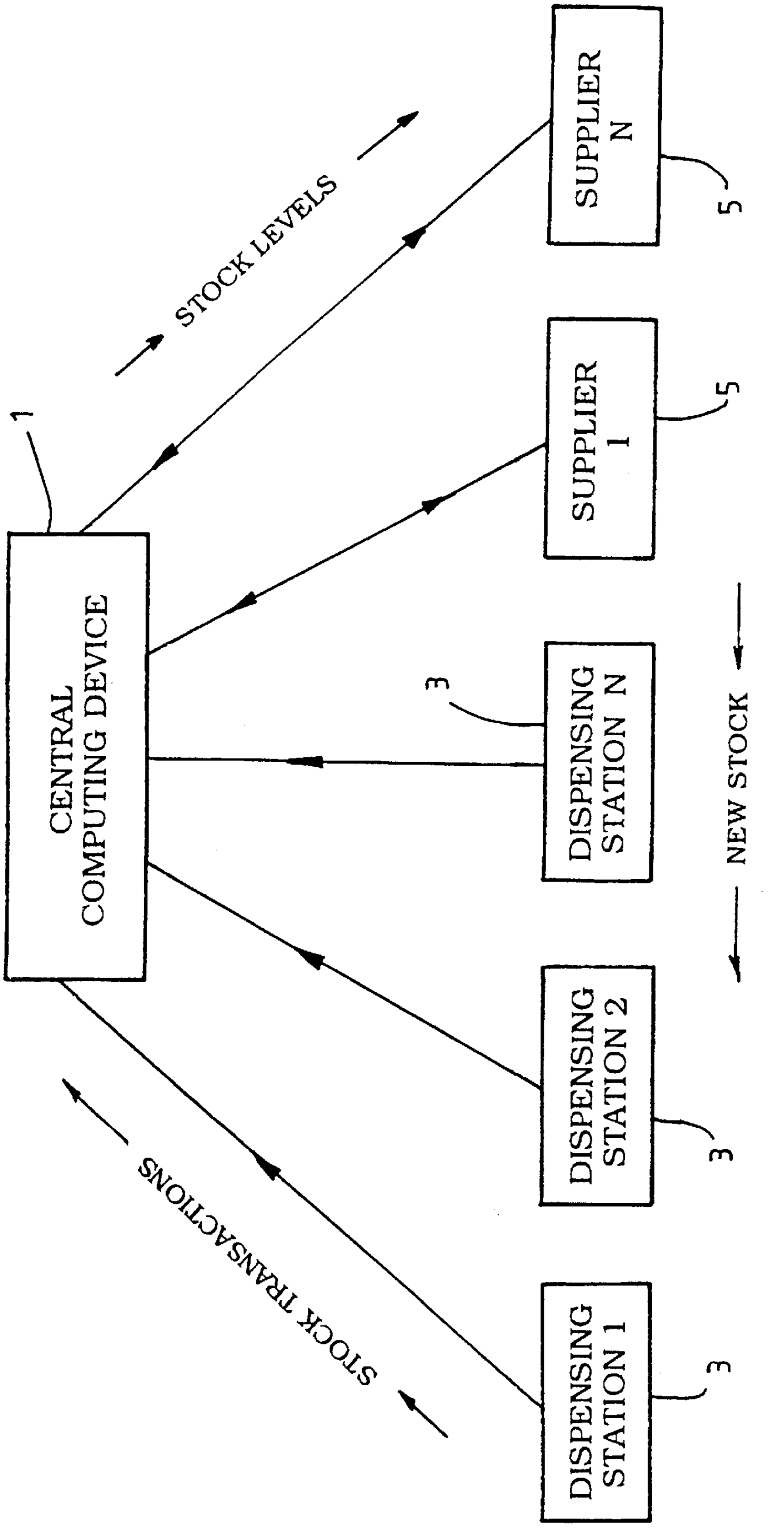
FIG. 1 is an overview schematic diagram showing a central computing device connected with a number of dispensing stations and a number of suppliers of bio-chemical products.

Referring firstly to FIG. 1 there is shown an overview block diagram of a typical total system for use in dispensing bio-chemical stock. The system 1 has a central computing device 1 which may be provided at convenient premises completely remote from dispensing stations 3. The dispensing stations 3 may be 1 through N in number. A number of suppliers 5 such as suppliers 1 through N for example, may be required to maintain stock at each of the dispensing stations 3. Accordingly, it can be seen that each of the dispensing stations 3 is connected with the central computing device 1, and that each of the suppliers 5 is also connected with the central computing device 1. Particulars relating to usage and dispensing of stock at the dispensing stations 3 are coupled with the central computing device 1 so that stock and user data available from the dispensing stations 3 can be transferred to and held in the central computing device 1. Each of the suppliers 5 is connected with the central computing device 1 so that each supplier 1 may interrogate the central computing device 1 concerning stock usage, and the central computing device 1 may relay information concerning such stock usage and other matters to each of the suppliers 5. The system provides for management of stock usage and enables an interface to be provided between stock usage and suppliers. Suppliers can inquire on stock numbers and age of stock at a dispensing station by accessing the central computer device 1. Stock usage can be controlled through use of automated dispensing stations that record the individual who has had a particular stock product dispensed and when that person had that stock dispensed, and restrict access to certain stock according to authorised stock dispensing for the particular person. The system can also track stock usage by, for example, department or project.

Thus, the central computing device 1 can be considered to have output means from which reports can be generated concerning stock. This output means may comprise output data lines from which data can be dispatched. The lines can be interrogated as a supplier interrogates the central computing device 1. Alternatively or additionally, it may include a monitor screen and/or a printer device or any other form of output device from which reports can be generated. The central computing device 1 contains a software program for controlling the computer device. Each of the dispensing stations 3 includes computing means, to be referred to directly, which controls operations at each dispensing station 3. Similarly, each supplier 5 has supplier computing means for controlling supplier interrogation and other matters relating to the system.

Typically, the interconnection between, the central computing device 1, the computing device at dispensing stations 3, and the computing device at the suppliers 5 is via the Internet.

Figure 2:
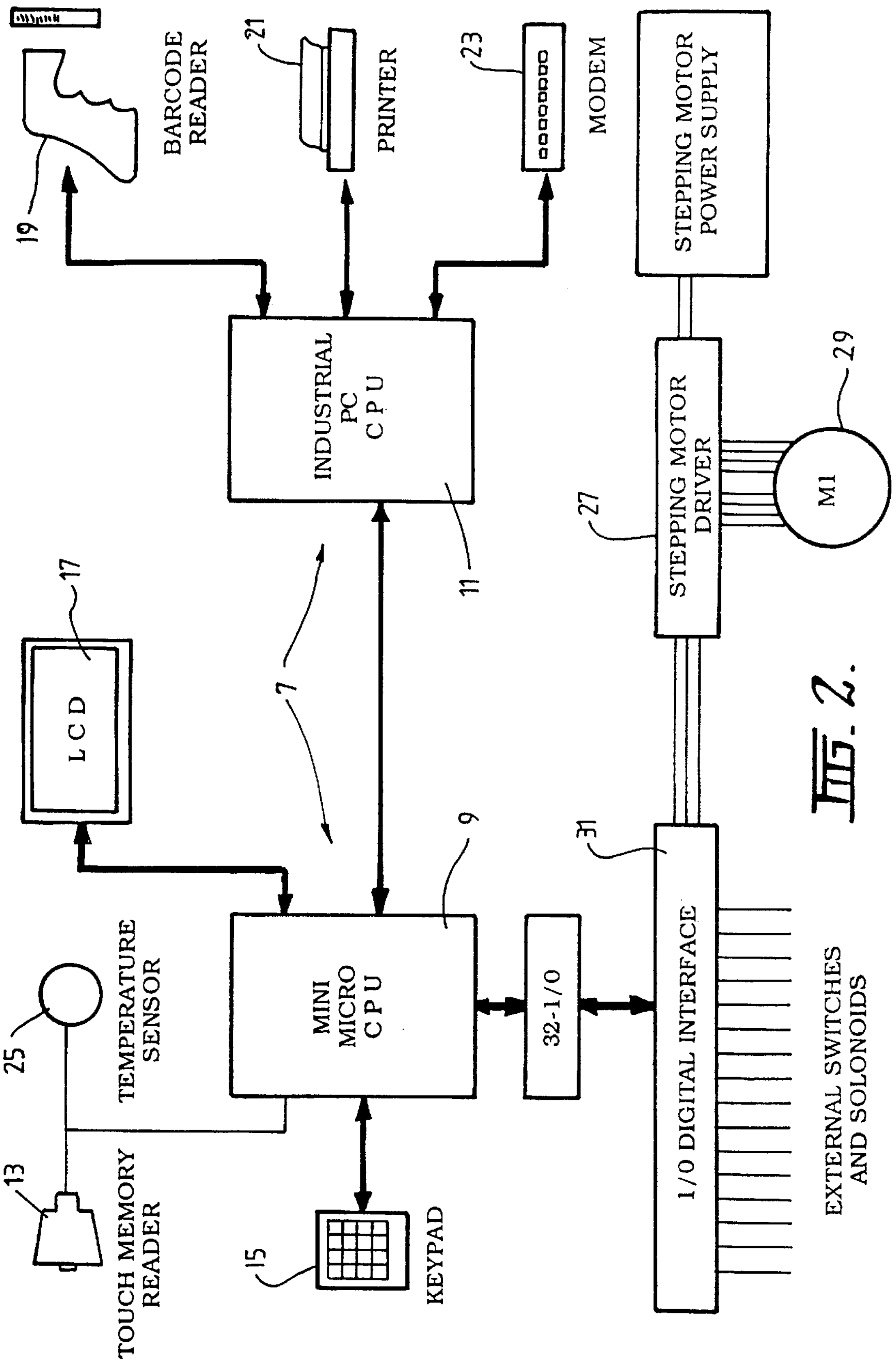
FIG. 2 is an overview block schematic diagram of the essential components at each dispensing station.

Referring now to FIG. 2 there is shown a schematic overview diagram of the functional components at each dispensing station 3. In the example described, each dispensing station 3 comprises a refrigerated cabinet in which the stock is stored. The refrigerated cabinet may, in fact, be a freezer and have appropriate means within the cabinet to arrange for selected stock to be dispensed. This will be described in due course. At the dispensing station 3 there is provided dispensing station computing means 7 which is comprised of two computing devices 9 and 11. Computing device 9 comprises a central processing unit such as a 486 mini PC, and computing device 11 comprises an industrial PC such as a 486 type running Windows 95. Connected with the dispensing station computing means 7 is a user identification input means 13 which in this embodiment comprises a touch memory optical reading device for use with optical type smart cards. Stock identification input means 15 is provided in the form of a touch keypad. In a variation the stock identification means 15 could comprise a touch screen with suitable software displaying possible options for stock selection. A dispensing station display means 17 is provided to provide user interactivity with the computing means 7 and the user identification input means 13 and the stock identification input means 15. Messages can be displayed on the display means 17 to step a user through the required input functions. Typically, the display means 17 comprises an LCD display. In the case where a touch screen is provided for the stock identification means 15, the touch screen can display messages otherwise displayed on the display means 17. In that event, the display means 17 may be dispensed with and all information otherwise displayed thereon then displayed on the touch screen. A stock identification input means 19 in the form of a bar-code reader is provided to identify stock as it is loaded into the dispensing station 3. An output means 21 in the form of a printer is also provided. A modem communication device 23 is provided to convey data relating to the user and the stock to the central computing device 1 as a further output means. A temperature sensing device 25 is provided to measure the temperature within the dispensing station 3.

Stock is dispensed from the dispensing station 3 by inputting stock identification through the stock identification input means 15. That information is then processed by the dispensing station computing means 7 to log user identification data input through the user identification input means 13 and identification data of the stock requested to be dispensed so that it can be provided to the central computing device 1 via the modem 23. Simultaneously with the input of identification data of stock to be dispensed, the dispensing station computing means 7 operates a stepping motor driver circuit 27 which, in turn, operates a motor means 29 and one or more solenoids connected to an I/O digital interface 31. Typically, the motor 29 is operated to rotate a dispensing mechanism so that a required stock item can be placed in a position so that a solenoid can be activated to, in turn, push that stock item so that it can fall to a dispensing chute. This will be described in due course. A solenoid lock for the door of the dispensing station may be provided so that if a person authorised to add stock to the dispensing station inserts their identification card into the user identification input means 13, the system will know that that person is a person authorised to load stock into the dispensing station 3. Thus, the door of the refrigerated cabinet can be released to permit stock to be added as will be described in due course.

Figure 3:
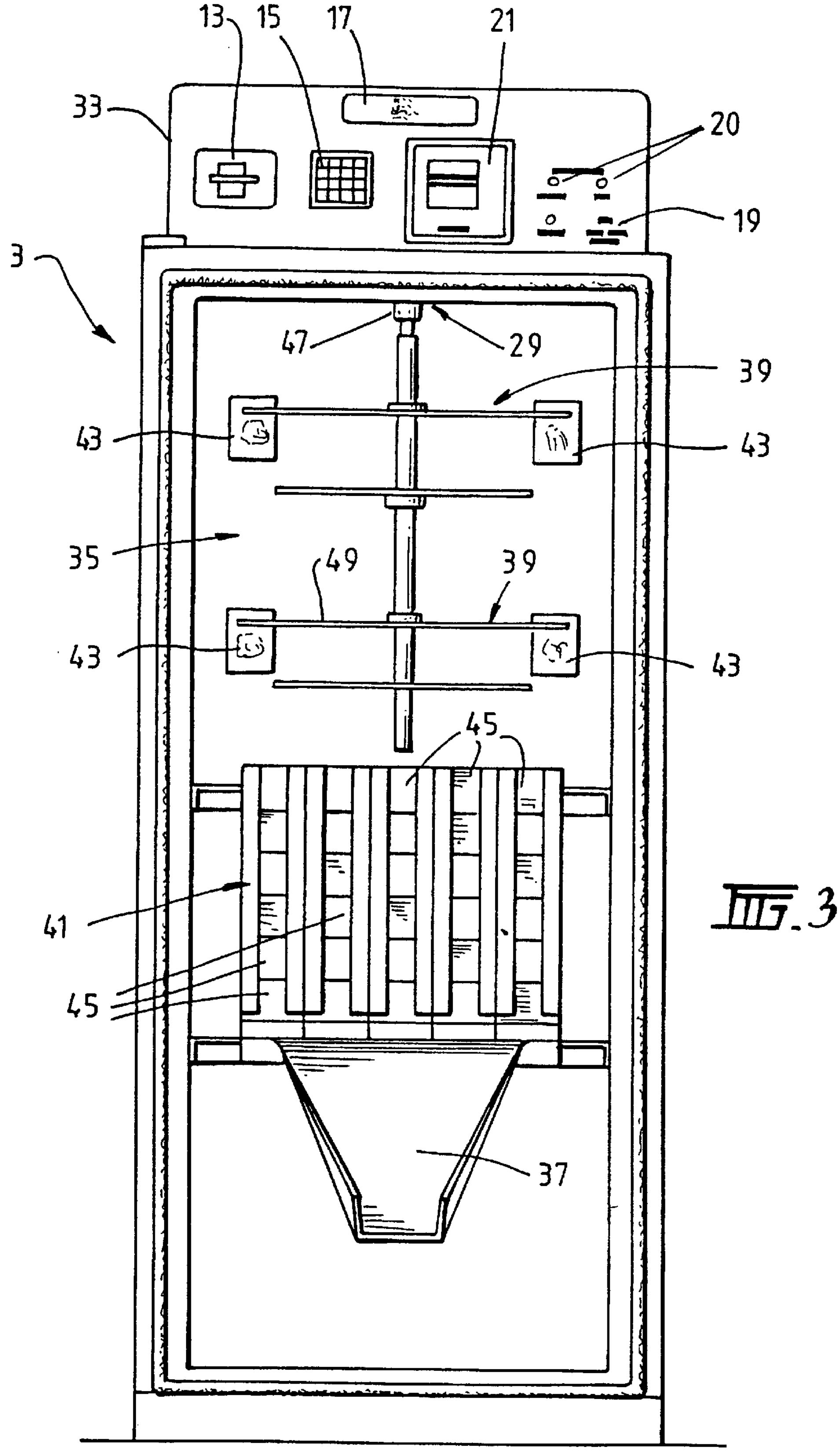
FIG. 3 is a front elevational view looking inside a refrigerated dispensing cabinet of a dispensing station.

Referring now to FIG. 3 there is shown a front view of a typical dispensing station 3 with a front door not shown. It can be seen that a front panel 33 has the dispensing station display means 17 provided in an upper portion, the stock identification input means 15 below the dispensing station display means 17, the user identification input means 13 along side the stock identification input means 15, and an outlet for the printer 21 also below the display means 17. A connector for the stock identification input means 19 is also provided on the panel 33. LED lamps 20 to indicate normal temperature or low temperature and power on or off are also provided on the panel 33.

Mounted within the cabinet 35 is a discharge slide chute 37 which catches stock as it falls by gravity from either a carousel 39 or a rack 41. Stock 43 is shown suspended from the carousel 39 and stock 45 is shown stacked within the rack 41. Solenoid pusher means to be described shortly push stock out of the carousel 39 or out of the rack 41 so that it can fall by gravity onto the upper portion of the chute 37 and slide down the chute 37 to be discharged through an opening in the front door of the cabinet 35.

FIGS. 4, 5 and 6 show the arrangement of the carousel which is releasibly fastened into the cabinet 35 onto a drive shaft 47 of the motor means 29. A pin or the like may be provided to permit releasible fastening of the carousel 39 relative to the draft shaft 47. In other words, the carousel 39 is suspended from the draft shaft 47 and removal of the pin will enable the carousel to be removed from the cabinet 35 for restocking. The carousel 39 has two identical disks 49 which are provided with a plurality of radial slots 51 (only some of which have been numbered in FIG. 4). The stock 43 is retained within hanger bags 53 which may be sealed at their upper portion by a zip like sealing means 59 which provides extra bulk width to the bags 53 at the point of sealing. Other forms of sealing may be utilised but the zip bag sealing is one preferred arrangement. The slots are sufficiently wide to accommodate the thickness of the bag 53 but are smaller dimension than the width of the sealing means 59. Thus, the bags 53 can be individually placed in each respective slot 51 and be suspended from the respective disks 49.

FIG. 5 shows that the bags 53 are held by the disks 49 so that they are suspended therefrom. When stock 43 is required to be dispensed, the carousel 39 is rotated to align the required stock 43 with a solenoid operated kicker 57. When the solenoid operated kicker 57 is activated under control of the dispensing station computing means 7, it causes a kicker arm 59 to swing about pivot 61 to engage with a radially innermost portion of the bag 53. Further swinging movement of the arm 59 causes the bag 53 to displace outwardly from the radially extending slots 51 and to fall by gravity into the chute 37 where the stock is dispensed. The stepping motor driving circuit 27 is also under control of the dispensing station computing means 7 so that it will index to the correct position to align the required stock with the kicker 57. This can all be controlled by the computing means at the dispensing station 3, knowing the stock provided at each of the slots 51, and then stepping the motor 29 under software control to the required position for dispensing.

The stock 45 held in the racks 41 is displaced by operation of a similar kicker to kicker 59 so that the lowermost stock 45 in the stack falls by gravity onto the chute 37 for subsequent dispensing. Details of the rack 41 and the kicker therefor have not been shown in detail. This can also be controlled in a similar manner by the computer and software programme.

By observing FIG. 6 it is seen that the disk 49 has a bar code 63 adjacent each of the slots 51. The upper portion 65 of the bag 53 is also provided with a bar code 67. Thus, when loading stock into the dispensing station 3, an authorised person will scan either the bar code 63 on the carousel disk 49 and then match it with an appropriate bar code 67 on the stock being added or visa-versa. It is particularly preferred that the bar code 63 correspond with the bar code 67 for particular stock. Software in the computer will then record the particular stock with particular slots 51. In a variation, the bar codes may be different and there may be provided software within the dispensing station computing means 7 to translate the respective bar codes to identify the stock in the particular slot 51. Thus, the computing means 7 is able to know the particular stock 43 which is held within the dispensing station 3 and its particular whereabouts within the dispensing station 3.

Figure 7:
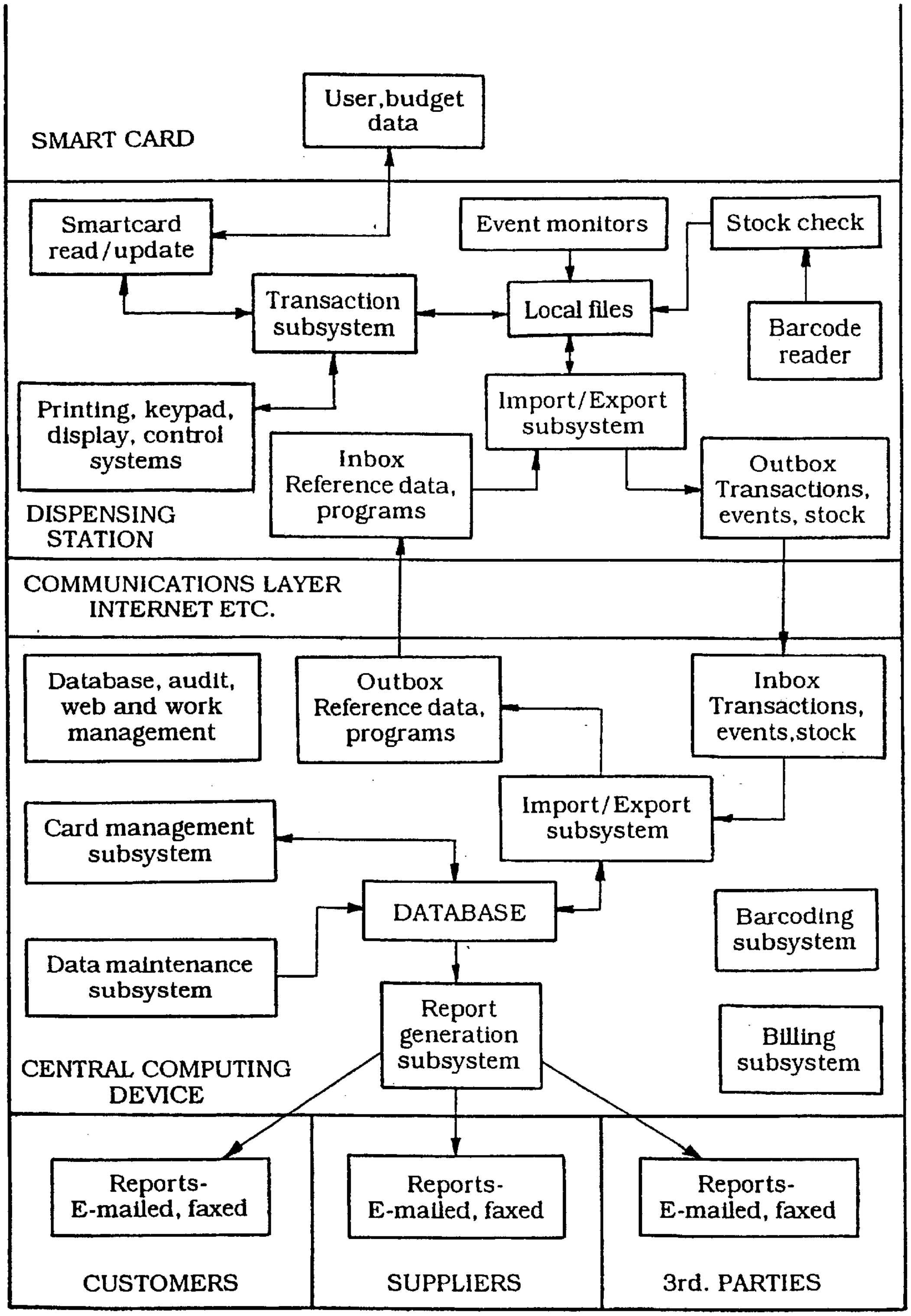
FIG. 7 is an overview system software function diagram.

Referring now to FIG. 7 there is shown an overview system software function diagram. This clearly shows the functionality at each dispensing station 3, communication via a suitable system such as the Internet or like system including dedicated hard wired systems if required, central computing device, and customer, suppliers and third parties. It can be seen that a user identification in the form of a smart card is used to input information into the dispensing station. The dispensing station computing means then processes the information and dispenses stock. Information relating to each dispensing operation such as identification of person, stock taken, cost of stock, date of stock, time of stock, can be recorded. That information is then dispatched to the central computing device where the information is received and suitably stored in a database. Periodically, reports can be generated which are then forwarded to the customers, suppliers or third parties. The customers, suppliers or third parties may also interrogate the central computing device to extract information concerning particular dispensing stations, on an as needs basis.

Functionality of software at a central computing device is set out below:

CENTRAL COMPUTING DEVICE FUNCTION

| STEP NO. | DESCRIPTION |
|---|---|
| 1 | Receive update reports from dispensing stations |
| 2 | File reports in database records |
| 3 | Periodically run checks on database records for each dispensing station. |
| 4. | Generate reports on step 3 and store for future access |
| 5. | Receive requests from suppliers or personnel at locations of dispensing stations to access stored reports. |

The functionality of product loading into a dispensing station is set out below:

| STEP NO. | DESCRIPTION | COMMENTS |
|---|---|---|
| 1 | No interaction-Welcome/status message displayed | Moving banner advertising new trial product. Red LED and beep if problem status. Display contact phone# |
| 2 | Insert smart card into input means 13 | Required PIN number |
| 3. | System reads user identification | Reject message - user/card expiry, card not valid, PIN not valid. |
| 4. | System checks user is allowed to use system | Reject message - user not allowed to use system |
| 5. | System displays layer number for first reload, requests confirm | Reload is done independently for each layer and selector. Steps 7–10 for layers. Steps 12 - for selectors |
| 6. | System displays reload message and prints required reload report | Report details which product goes where. |
| 7. | User opens freezer and removes rotor layer | Door is left open for short time only |
| 8. | User first scans product then slot for all the products on the report while loading the products. | A single beep for each bar code read. A double beep if the product and slot match the reload report successfully. A continuous beep if an error occurs and a message why. |
| 9. | On completion the layer is re-inserted into freezer | Door is left open for short time only. |
| 10. | Success message displayed when all products reloaded. Success report printed or partial report printed. Event logged | No user interface required. |

-continued

| STEP NO. | DESCRIPTION | COMMENTS |
|---|---|---|
| 11. | Go to Step 5 or remove card for end of transaction | Message displayed for 5s before reload continues. |
| 12. | User opens freezer | Door left open for longer but kit reload is quicker. |
| 13. | User scans kits then slot before dropping kit into slot | A single beep for each bar code read. A double beep if the product and slot match the reload report successfully. A continuous beep if an error occurs and a message why, |
| 14. | User closes freezer | |
| 15. | Success message displayed when all products reloaded. Success report printed or partial report printed. Event logged | No user interface required. |
| 16. | Go to Step 5 or remove card for end of transaction | Message displayed for 5s before reload continuous |
| 17. | Download new data to central computing device via modem | Download transparent to user |

The dispensing transaction functions at each dispensing station are functionally set out below:

| STEP NO. | DESCRIPTION | COMMENTS |
|---|---|---|
| 1. | No interaction- Welcome/status message displayed | Moving banner advertising new trial product Red LED and beep if problem status. Display contact phone |
| 2. | Insert smart card into user identification input means 13 | PIN number |
| 3. | System reads user identification | Reject message - user/card expiry, card not valid, PIN not valid |
| 4. | System checks user is allowed to use system | Reject message - user not allowed to use system. |
| 5. | System checks finds available | Funds notification message |
| 6. | Product selection | Consistent product codes Preferably menu driven scroll by name because codes will not be meaningful to researcher. Only display those products the user is able to get (authority, budget, in stock) |
| 7. | Verification by name of product and cost | Reject message if authority not adequate or expired for this product. Reject message if funds not adequate Out of stock, logged (potential reorder event triggered) |
| 8. | Confirmation of receipt via PIN pad (check door, check package dropped etc.) | |
| 9. | Print of receipt | Configurable by customer |
| 10 | Record transaction in the system | |
| 11 | Record transaction on the card (Budget?) | Configurable by customer |
| 12. | Depart or request another product? | Shortcut or the full procedure again? |
| 13. | Download product dispensing | Download transparent to user |

Modifications may be made to the invention as would be apparent to persons skilled in stock dispensing arts and/or the computer arts. These and other modifications may be made without departing from the ambit of the invention the nature of which is to be determined from the afore going description.

What is claimed is:

1. A computerized stock control system having:

a) a central computer device for controlling a central part of the system b) at least one dispensing station where stock can be dispensed, c) an output means from which reports can be generated concerning stock, d) a software program controlling said computer device for controlling the central part of the system;

said at least one dispensing station including user identification means, and stock identification output means to provide identification of stock to be dispensed from said dispensing station and stock identification input means to provide identification of stock which is passed into said dispensing station for subsequent dispensing, dispensing station computing means connected with said user identification means and said input means, and a software program for controlling said dispensing station computing means, said dispensing station computing means being coupled with said central computer device to pass stock and user data therebetween;

said system operating such that when stock is passed into said dispensing station, said stock identification input means is used to obtain data relating to the stock being passed, and when stock is required to be dispensed a user must enter user identification data through said user identification means and be acknowledged by the dispensing station computing means as an authorized person to dispense stock to and said user must also enter identification data of stock to be dispensed through said stock identification output means which then clears the system for dispensing the requested stock, said dispensing station computing means logging the user identification data and the identification data of stock to be dispensed and conveying that data to said central computer device, said central computer device processing that data and providing a report via said output means concerning stock dispensing, said at least one dispensing station being a refrigerated cabinet for holding a variety of stock that needs to be maintained refrigerated, said at least one dispensing station having a motor driven carousel on to which a variety of individual stock items can be stored, said dispensing station computing means controlling said motor driven carousel and a selecting means for selecting stock to be dispensed, so that following selection of stock from said variety of stock, both said motor driven carousel and said selecting means will be operated to dispense the selected stock.

2. A stock control system as claimed in claim 1 wherein said user identification means must be activated by a person adding stock to said dispensing station so that data identifying that person can be acknowledged by the dispensing station computer means as an authorised stock adding person in order that the system will accept data from said input - means which identifies stock being passed into said dispensing station.

3. A stock control system as claimed in claim 1 wherein said dispensing station is a manual dispensing station where an authorised attendant manually picks stock to be dispensed in response to the system being cleared to dispense stock.

4. A stock control system as claimed in claim 1 wherein the user identification data is used to check against authorization records to determine particular stock that is allowed to be dispensed to that user and to determine stock that is not allowed to be dispensed to that user.

5. A stock control system as claimed in claim 1 wherein said dispensing station user identification means comprises a reader means for reading user identification code on a user carried card.

6. A stock control system as claimed in claim 5 wherein said user carried card contains not only a record of the user identification but data of budget amounts for that user, and said software at said dispensing station is able to interrogate said card to extract that data of budget amounts and calculate if requested stock is within the budget amount and to update the card with the remaining balance against budget after dispensing the requested stock.

* * * * *